April 18, 1967
W. W. SMITH
3,314,820
COMPACT ELEMENT FOR ELECTRIC STORAGE BATTERY CELLS
AND A METHOD FOR PREPARING IT
Filed Feb. 4, 1963
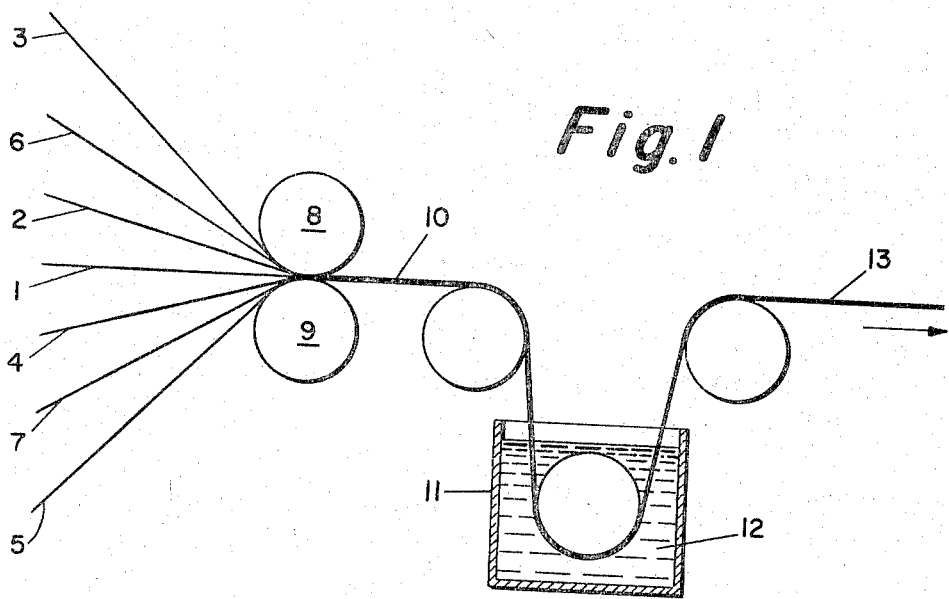
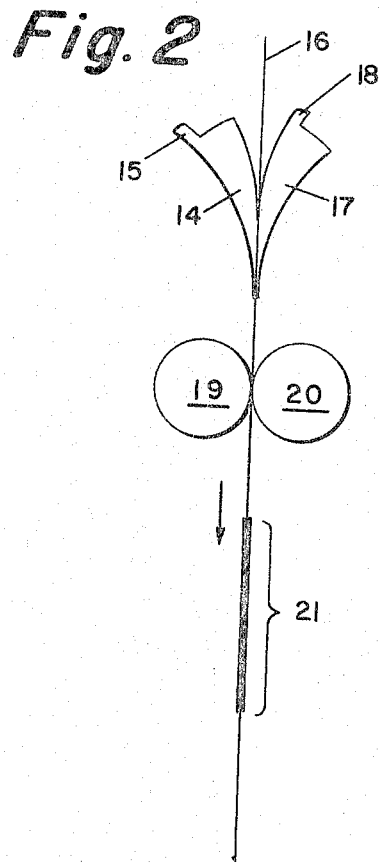
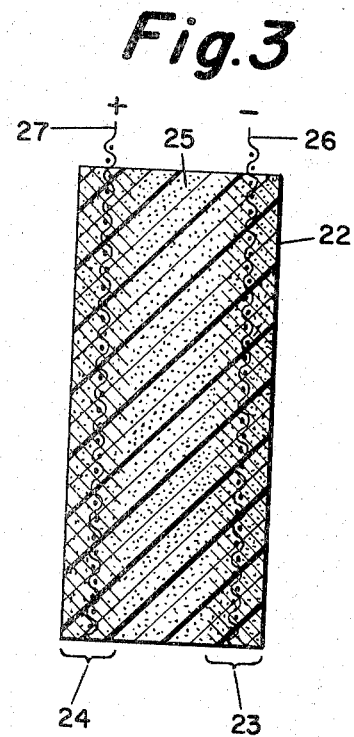

United States Patent Office 3,314,820
Patented Apr. 18, 1967

3,314,820
COMPACT ELEMENT FOR ELECTRIC STORAGE BATTERY CELLS AND A METHOD FOR PREPARING IT
William Wharton Smith, Philadelphia, Pa., assignor to The Electric Storage Battery Company, a corporation of New Jersey
Filed Feb. 4, 1963, Ser. No. 256,032
10 Claims. (Cl. 136—6)

This invention relates to a compact element for electric storage battery cells, and in particular, to an easy and convenient method for assembling negative electrodes, positive electrodes and a separator into compact elements for use in electric storage battery cells.

Recent developments in the electric storage battery art have provided methods for preparing positive and negative battery electrodes from compositions containing a soluble pore former and a thermoplastic resin permanent binder. In a similar manner, there are several methods for preparing microporous separators which also utilize soluble pore formers. It is an object of this invention to adapt the procedure of using a thermoplastic resin permanent binder and a soluble pore former to a method for preparing and assembling compact battery elements comprising positive and negative electrodes and a separator.

Another object of the invention is to provide a method for preparing a compact battery element which may readily be rolled up into a spiral coil cell.

Still another object of this invention is to provide a compact battery element having extremely rugged construction enabling it to withstand vibration abuse.

It is a further object of the invention to provide a battery element having no plate boundaries and having a unitary microporous structure of plastic extending from the positive electrode through the separator to the negative electrode.

Other objects and purposes of this invention will be apparent to those skilled in the art in view of the following description and the drawings in which:

FIGURE 1 is a schematic diagram illustrating the preferred method of preparing compact battery elements in accordance with this invention;

FIGURE 2 is a schematic diagram illustrating an alternative method of preparing compact battery elements in accordance with this invention; and FIGURE 3 is an enlarged cross-sectional view of a compact battery element prepared in accordance with this invention.

It has been discovered that an easy and convenient method for assembling and preparing compact battery elements may be provided by utilizing negative and positive electrodes and a separator which are prepared from compositions containing a thermoplastic resin and a soluble pore former. In accordance with this invention, sheet material comprising positive electrode active material, a thermoplastic resin permanent binder and a soluble pore former is disposed opposite a sheet comprising negative electrode active material, a thermoplastic resin permanent binder and a soluble pore former, with a separator sheet also containing a thermoplastic resin and a soluble pore former interposed between the electrode sheets. The sheets (both electrodes with separator interposed) are then passed between heated rollers which engage the electrode sheets and compress them against the separator. The heat and pressure of the rollers causes the thermoplastic resin permanent binder of the electrode sheets to fuse with the separator material to form a unitary structure having a plastic matrix extending from the positive electrode through the separator to the negative electrode.

After the electrode sheets and separator have been transformed into a unitary structure, it may be stored and later subjected to solvent action to leach out substantially all of the soluble pore former from both electrodes and the separator, or it may immediately be passed into a bath comprising a solvent for the pore former. It is preferred that the same soluble pore former be used in both electrodes and separator, thereby permitting the use of a single solvent bath to leach out the pore former. Alternatively, different pore formers may be used which are soluble in a common solvent, or, though not preferred, a plurality of solvent baths may be used to leach out the pore former. Whether one or more solvents are used, it is essential that the solvent does not dissolve or otherwise adversely affect the electrochemically active material in the electrode sheets, the thermoplastic resin permanent binder or any filler present in the electrode sheets and the permanent thermoplastic resin portion of the separator.

Several materials may be utilized as the soluble pore former. It is well known that starch and soluble inorganic salts are effective pore forming materials. A recent development utilizes soluble thermoplastic resins as pore forming materials. These soluble thermoplastic resins function as both pore formers and as temporary binders, that is they lend strength to the compositions and electrodes prepared therefrom until they are leached from the composition to form pores. Since the electrode sheets and the separator are subjected to several processing and handling operations before the pore former is dissolved, it is preferred to use a soluble thermoplastic resin as the pore former.

In addition to the soluble pore former, the electrode sheets also contain a thermoplastic resin permanent binder. The permanent binder of each electrode sheet is intended to fuse with the separator material, and therefore, the thermoplastic resin which is used as the permanent binder must be selected from those resins which will fuse with the thermoplastic resin separator material. Generally, it is preferred that the resin used as the permanent binder be the same resin as that comprising the separator which avoids the problem of resin incompatibility. It is possible to use a thermoplastic resin permanent binder differing from the separator material if it can be fused with the separator, for example polyethylene and polypropylene are different resins which can be fused. The thermoplastic resin permanent binder should be incompatible with the pore former resin if one is used, and should not be dissolved or otherwise adversely affected by the solvent or solvents used to leach out the pore former.

After the electrode sheets and separator have been transformed into a unitary structure, it may be passed through a solvent bath to leach out the soluble pore former, yielding a unitary microporous plastic sheet which is particularly adapted for use as an electric storage battery element. Battery elements prepared in this manner have no plate boundaries which makes them particularly useful in sealed cells, for this compact, unitary structure should facilitate the transfer of gas between the electrodes which is necessary for the recombination of evolved oxygen with the electrochemically active material. In addition, these battery elements may have expanded metal, perforated metal, woven screen or other grid forming members inserted between like electrode sheets which combined with the fused plastic structure gives them a very rugged construction and enables them to withstand a great deal of vibration abuse. The unitary microporous sheets may be readily cut into battery plate pairs and rolled up into a spiral coil cell.

For a better understanding of the features and advantages of this invention, the drawings will now be referred to. FIGURE 1 is a schematic illustration of the preferred method of this invention. In FIGURE 1, a separator sheet 1, comprising a thermoplastic resin which contains a soluble pore former, is placed between positive electrode sheets 2 and 3, comprising a positive active material, a thermoplastic resin permanent binder and a soluble pore former, and negative electrode sheets 4 and 5, comprising a negative active material, a thermoplastic resin permanent binder and a soluble pore former. Sheets 6 and 7 of expanded metal, perforated metal, woven screen or other grid material are inserted between the positive and negative electrodes respectively. The grid acts as a current collector for removing current from the electrodes and also contributes to the structural ruggedness of the electrode-separator assembly. If no grid is used, a current collector of some kind, e.g. a wire, must be inserted in the electrodes.

The sheets 1 to 7 are passed between two heated rollers 8 and 9 which simultaneously heat the sheets and compress them. The rollers are maintained at a temperature sufficient to cause the thermoplastic resin permanent binder in the electrode sheets and the separator material to fuse into a unitary plastic sheet 10, i.e. the rollers must be at least as hot as the melting point of the resin, but the heated rollers should not be maintained at such a high temperature as to adversely affect the other materials which are present in the sheets. The temperature of the heated rollers will vary depending upon the particular thermoplastic resin permanent binder and other materials which may be present. In general, a temperature ranging from about 100° C. to 150° C. will be suitable when the separator and permanent binder is polyethylene and the soluble pore former is polyoxyethylene.

The heated rollers are set so as to exert pressure on the sheets passing therebetween. The pressure exerted on the sheets will vary depending upon the materials comprising the sheets, the temperature of the rollers, the thickness of the sheets passing between the rollers, and the desired thickness of the battery element. Pressures ranging from about 12.6 kg./cm.² to about 175 kg./cm.³ will usually be adequate when the thermoplastic resins are polyethylene and polyoxyethylene.

The unitary plastic sheet 10 may be stored after it leaves the heated rollers or it may immediately be passed into a solvent bath 11. The solvent 12 is selected so that it will leach out substantially all of the pore former from the electrode sheets and the separator, thereby rendering the unitary plastic sheet 13 microporous. As previously indicated, a unitary microporous plastic sheet prepared in accordance with this invention may readily be cut into battery elements and rolled up into a spiral coil cell, i.e. two of the microporous plastic sheets can be placed together with the positive sides facing each other or the negative sides facing each other and the pair of sheets rolled into a spiral coil.

In FIGURE 1, there is illustrated only one pair of heated rollers 8 and 9. In some cases it may be necessary to have more than one pair of rollers in order to avoid overheating or overstressing the external sheets, i.e. those in contact with the rollers. For instance, two additional pair of heated rollers might be used, one pair to compact positive electrode sheets 2 and 3 into grid 6 prior to passing between rollers 8 and 9 and the other pair to compact negative electrode sheets 4 and 5 into grid 7 prior to passing between rollers 8 and 9.

Furthermore, FIGURE 1 demonstrates the use of heated rollers to raise the temperature of the thermoplastic resin permanent binder in the electrode sheets and the separator to the melting point. Alternatively, the sheets may be passed through an oven prior to compacting them, in which case it may not be necessary to heat rollers 8 and 9, or the sheets may be heated by passing them through a high frequency field prior to compressing them.

FIGURE 2 illustrates an alternative method for preparing compact battery elements in accordance with this invention. A positive electrode 14 having a terminal lug 15, which electrode has been pre-cut, is placed on one side of a separator 16, and a negative electrode 17 having a terminal lug 18 is placed on the other side of the separator. Both of the electrodes and the separator contain a soluble pore former and also a permanent thermoplastic resin. The electrodes and the separator are passed between heated rollers 19 and 20 wherein they are compressed and heated to a point sufficient to cause the thermoplastic resin permanent binder in the electrodes and the separator to fuse, forming a unitary plastic structure. As the electrode sheets and the separator leave the heated rollers, they are in the form of a unitary plastic sheet 21. Subsequently, the unitary plastic sheet is passed through a solvent bath to leach out substantially all of the pore former, and the separator sheet is cut to conform to the shape of the electrode pack.

FIGURE 3 is an enlarged cross-sectional view of a compact battery element 22 made in accordance with this invention. The element comprises a unitary microporous plastic structure having three regions, a negative electrode region 23, a positive electrode region 24 and a separator region 25 interposed between the negative and positive electrode regions. There is a grid 26 inserted in the negative electrode region and also a grid 27 inserted in the positive electrode region.

The electrode-separator unitary structure should be retained in the solvent bath long enough to remove substantially all of the pore former but insufficient to dissolve or otherwise adversely affect the permanent thermoplastic resin binder. The duration of the residence of the unitary structure in the solvent bath depends upon the solubility of the pore former in the solvent, the solvent temperature, the agitation of the solvent and the thickness of the sheet. In general, agitated hot water will remove a polyoxyethylene resin pore former from a relatively thin unitary structure within several minutes.

Many different types of thermoplastic resins may be used as permanent binder material in the electrode sheets and as the separator material, e.g. polyethylene, polypropylene, polystyrene and polyvinyl chloride. Furthermore, many different types of thermoplastic resin pore formers may also be used. Water soluble thermoplastic resins, such as polyethylene oxide, polyethylene glycol and polyvinyl pyrrolidone, are particularly preferred because of the low cost of the solvent and the fact that water does not adversely affect the other materials present in the electrodes and the separator. As previously stated, pore formers such as starch or soluble inorganic salts may be used instead of the soluble resins, but it is preferred to use thermoplastic resin pore formers. It should be understood, however, that it is not necessary that the pore former be water soluble, for pore forming materials soluble in other solvents may be used.

The electrode sheets used in the method of its invention comprise an electrochemically active material, a thermoplastic resin permanent binder and a pore former. If a pore former resin is used, it should be incompatible with the permanent binder resin and it should be readily soluble in a solvent in which the permanent binder resin is substantially insoluble. A detailed description of how to prepare the electrode sheets used in the preferred methods of this invention may be found in application Ser. No. 147,702, filed by Joseph C. Duddy on Oct. 13, 1961, and now U.S. Patent No. 3,121,029, and assigned to the assignee of this application.

The separator sheet used in the method of this invention is prepared from a thermoplastic resin and also contains a pore former. There are several methods for preparing thermoplastic resin separator sheets which contain a soluble pore former, e.g. U.S. Patent No. 2,773,286 issued to Piccart et al., U.S. Patent Nos. 2,806,256 and 3,020,597 issued to R. Smith-Johannesen, U.S. Patent No. 2,894,289 issued to B. G. Harper et al., and application Ser. No. 818,515 filed by Joseph C. Duddy on June 8, 1959 and assigned to the assignee of this application.

The method of preparing compact battery elements in accordance with this invention has several features and advantages. The electrode sheets and the separator contain a soluble pore former which makes it possible to remove the pore former from the electrodes and the separator in one easy leaching operation instead of several. Both types of electrode sheets (positive and negative) contain a thermoplastic resin permanent binder which will fuse with the separator material and thereby form a rugged, unitary plastic structure. In addition, this method enables one to press the electrode material of each electrode into a grid in one operation.

The following examples are presented to illustrate the materials and methods of this invention and the advantages procured by these methods:

EXAMPLE I

One part by weight of polyethylene in pellet form ("Alathon 14" manufactured by E. I. du Pont de Nemours & Co.), which comprises the thermoplastic resin permanent binder, and 3 parts by weight of powdered polyethylene oxide ("Polyox" WSR-35 manufactured by Union Carbide & Chemical Co.), the soluble thermoplastic resin pore former, are mixed under heat and pressure to produce a plasticized mass. The resins are mixed on a roller mill which has heated rollers maintained in the temperature range of from about 104° C. to about 121° C. and operated at differential speeds for plasticizing the resins. After the plasticization of the resins is completed, about 3 minutes of mixing time is required for polyethylene and polyethylene oxide, 28 parts by weight of finely powdered cadmium oxide is added to the plasticized resin mass and the mixing on the roller mill is resumed for about 7 minutes.

When the mixture of thermoplastic resins and cadmium oxide is removed from the roller mill, it is fed between calendering rolls which are heated to a temperature of about 110° C. The calendering rolls are set to produce a sheet about 10 mils thick.

EXAMPLE II

Nickel electrode sheets were prepared in a manner similar to the production of the cadmium electrode sheets of Example I. One part by weight of polyethylene and 1.7 parts by weight of polyethylene oxide are mixed on a roller mill in the same manner and under the same conditions as in Example I. 12.2 parts by weight of green nickel hydrate and 2.8 parts by weight of powdered graphite are then mixed into the plasticized resin mass. Prior to mixing the graphite and nickel hydrate into the resin mass, they are premixed in a ball mill for about 10 hours in order to thoroughly coat the nickel hydrate particles with graphite. After the nickel hydrate and graphite have been thoroughly mixed into the resin mass for about 10 minutes on the roller mill, the plasticized mass is removed from the mill and calendered to produce a sheet about 9 mils thick.

EXAMPLE III

A polyethylene separator sheet is prepared by intimately mixing polyethylene and polyethylene oxide in equal parts by weight in an intensive mixer. The mixer is maintained at a temperature of from about 104° C. to about 121° C. which is suitable for plasticizing these resins. After mixing the thermoplastic resins for about 3 minutes, they are removed from the mixer and calendered at a temperature of about 121° C. to form a polyethylene separator sheet having a thickness of about 5 mils.

EXAMPLE IV

Two sheets of nickel electrode material prepared in a manner similar to that described in Example II, with an expanded nickel sheet inserted therebetween as a grid, are placed on one side of a polyethylene separator sheet prepared in a manner similar to that described in Example III, and two sheets of cadmium electrode material prepared in a manner similar to that described in Example I, with an expanded nickel sheet inserted therebetween as a grid, are placed on the other side of the polyethylene separator sheet. These sheets are simultaneously passed through two heated rollers, indicated by numerals 8 and 9 in FIGURE 1, which are maintained at a temperature of about 150° C. and the sheets are also compressed by the rollers. The pressure exerted by the rollers on the sheets amounts to about 140 kg./cm.$^2$. The heat and the pressure causes the polyethylene in the electrodes and the separator to fuse, thereby forming a unitary plastic structure.

As the unitary plastic sheet passes from between the heated rollers, it is passed into a solvent bath. Since polyethylene oxide is water soluble, warm water is used as the solvent bath. The unitary plastic sheet is allowed to remain in the water for about 10 minutes to leach out substantially all of the polyethylene oxide, after which it is dried. The final product is a compact nickel-cadmium element which may be rolled up into a spiral coil cell, or flat battery electrodes may be cut from it.

The above examples illustrate the preparation of electrode sheet materials and their manufacture into compact battery elements. While the above examples and FIGURE 1 illustrate the use of two electrode sheets with an interposed grid, it should be noted that one or more electrode sheets and grids may be used.

As used in the claims which follow, the term electrode sheet material is intended to include sheets of material which have not been shaped into the form in which they will be used and also sheets of material which have been shaped into electrode forms which require no further shaping.

Having completely described the nature of this invention, what is claimed:

1. A method for preparing a compact storage battery element which comprises heating and compressing an electrode sheet material comprising a positive electrode active material, a soluble pore former and a thermoplastic resin permanent binder disposed opposite an electrode sheet material comprising a negative electrode active material, a soluble pore former and a thermoplastic resin permanent binder, with a separator sheet containing a soluble pore former interposed between said electrode sheets, to fuse the electrode sheets to the separator sheet to form a unitary plastic sheet and thereafter contacting the unitary plastic sheet with a solvent to leach out substantially all of the soluble pore former from the electrodes and the separator.

2. A method in accordance with claim 1 in which the pore former used in the positive electrode sheet material, negative electrode sheet material and separator is soluble in the same solvent.

3. A method in accordance with claim 2 in which there are a plurality of positive electrode sheets and a plurality of negative electrode sheets provided that a sheet of metallic grid material is inserted between at least one pair of adjacent positive and negative electrode sheets, and the soluble pore former is a thermoplastic resin.

4. A method in accordance with claim 3 in which the thermoplastic resin pore former is selected from the group consisting of polyethylene oxide, polyethylene glycol and polyvinyl pyrrolidone, and the thermoplastic resin permanent binder is selected from the group consisting of polyethylene, polypropylene, polystyrene and polyvinylchloride.

5. A method in accordance with claim 4 in which the thermoplastic resin pore former is polyethylene oxide and the thermoplastic resin permanent binder is polyethylene.

6. A method in accordance with claim 5 in which the sheet material is passed between heated rollers maintained at a temperature ranging from about 110° C. to about 150° C. and the rollers exert a pressure on the electrode sheets ranging from about 12.6 kg./cm.$^2$ to about 175 kg./cm.$^2$.

7. A compact storage battery element having a unitary structure comprising a positive active material dispersed in a microporous thermoplastic resin binder, a negative active material dispersed in a microporous thermoplastic resin binder and a microporous thermoplastic resin separator interposed between the positive and negative active material, said microporous thermoplastic resin separator being fused to both the microporous thermoplastic resin binder for the positive active material and the microporous thermoplastic resin binder for the negative active material so as to form a strong, unitary storage battery element.

8. A compact storage battery element in accordance with claim 7 in which the microporous thermoplastic resin binder and separator is polyethylene, polypropylene, polystyrene or polyvinyl chloride.

9. A compact storage battery element in accordance with claim 7 in which the microporous thermoplastic resin binder and separator is polyethylene.

10. A compact storage battery element in accordance with claim 7 in which the microporous thermoplastic resin binder and the microporous thermoplastic resin separator are the same resin.

References Cited by the Examiner
UNITED STATES PATENTS

| | | | |
|---|---|---|---|
| 3,004,094 | 10/1961 | Haessly | 136—175 |
| 3,023,259 | 2/1962 | Coler et al. | 136—24 X |
| 3,045,058 | 7/1962 | Martinak | 136—146 |
| 3,075,033 | 1/1963 | Salkind | 136—24 |
| 3,081,372 | 3/1963 | Soltis | 136—145 |

WINSTON A. DOUGLAS, *Primary Examiner.*

MURRAY TILLMAN, *Examiner.*

B. J. OHLENDORF, A. SKAPARS, *Assistant Examiners.*